(12) United States Patent
Schiele et al.

(10) Patent No.: US 10,071,485 B2
(45) Date of Patent: Sep. 11, 2018

(54) HAND CONTROLLER DEVICE

(71) Applicant: ESA—EUROPEAN SPACE AGENCY, Paris (FR)

(72) Inventors: André Schiele, Leiden (NL); Frank Van Der Hulst, Leiden (NL)

(73) Assignee: EUROPEAN SPACE AGENCY, Paris (FR)

( * ) Notice: Subject to any disclaimer, the term of this patent is extended or adjusted under 35 U.S.C. 154(b) by 485 days.

(21) Appl. No.: 14/442,965

(22) PCT Filed: Nov. 14, 2012

(86) PCT No.: PCT/EP2012/072647
§ 371 (c)(1),
(2) Date: May 14, 2015

(87) PCT Pub. No.: WO2014/075720
PCT Pub. Date: May 22, 2014

(65) Prior Publication Data
US 2015/0290814 A1    Oct. 15, 2015

(51) Int. Cl.
*B25J 13/02*    (2006.01)
*G05G 1/04*    (2006.01)
*G06F 3/01*    (2006.01)

(52) U.S. Cl.
CPC .............. *B25J 13/025* (2013.01); *G05G 1/04* (2013.01); *G06F 3/016* (2013.01); *G06F 2203/04104* (2013.01)

(58) Field of Classification Search
CPC ........................ G06F 2203/04104; B25J 13/025
See application file for complete search history.

(56) References Cited

U.S. PATENT DOCUMENTS 5,193,963 A * 3/1993 McAffee .................... B25J 3/04
                                                                    414/5
6,016,385 A    1/2000 Yee et al.
(Continued)

FOREIGN PATENT DOCUMENTS

EP    1629949 A2    3/2006
WO    2008/074081 A1    6/2008
(Continued)

OTHER PUBLICATIONS

May 16, 2013 Written Opinion and International Search Report issued in International Application No. PCT/EP2012/072647.
(Continued)

*Primary Examiner* — Terence Boes
(74) *Attorney, Agent, or Firm* — Eversheds Sutherland (US) LLP

(57) ABSTRACT

Provided is a hand controller device for detecting movement of one or more fingers of a user holding the device. The device includes: a support structure and opposing first and second finger supporting means, at least one of the finger supporting means being movably coupled to the support structure so that a movement of the movable supporting means increases or reduces an opening angle and/or distance between the opposing first and second finger supporting means; and a force and/or torque generation means that generates a force and/or torque between the first and second finger supporting means. The first and second finger supporting means include a finger detecting means to detect if the user's finger is in contact with a surface of the first and/or second finger supporting means, independently of whether or not the movable supporting means is moved.

14 Claims, 15 Drawing Sheets

(56) References Cited

U.S. PATENT DOCUMENTS

| | | | |
|---|---|---|---|
| 6,323,846 B1* | 11/2001 | Westerman | G06F 3/0235 345/173 |
| 2012/0041595 A1* | 2/2012 | Greeley | B25J 3/04 700/264 |
| 2013/0173055 A1* | 7/2013 | Kim | B25J 9/1612 700/245 |

FOREIGN PATENT DOCUMENTS

| | | |
|---|---|---|
| WO | 2011/116332 A2 | 9/2011 |
| WO | 2012/081402 A1 | 6/2012 |

OTHER PUBLICATIONS

Nakagawara et al., "An encounter-type multi-fingered master hand using circuitous joins," in IEEE Int. Conf. Robotics and Automation ICRA, Apr. 2005, pp. 2667-2672.

Fontana et al., "Mechanical design of a novel hand exoskeleton for accurate force displaying," in Proc. IEEE Int. Conf. Robotics and Automation ICRA.

Hasegawa et al., "Five-fingered assistive hand with mechanical compliance of human finger," in IEEE Int. Conf. Robotics and Automation ICRA, 2008, pp. 718-724.

A. Wege and A. Zimmermann, "Electromyography sensor based control for a hand exoskeleton" in Proc. IEEE Int. Conf. Robotics and Biomimetrics ROBIO, 2007, pp. 1470-1475.

\* cited by examiner

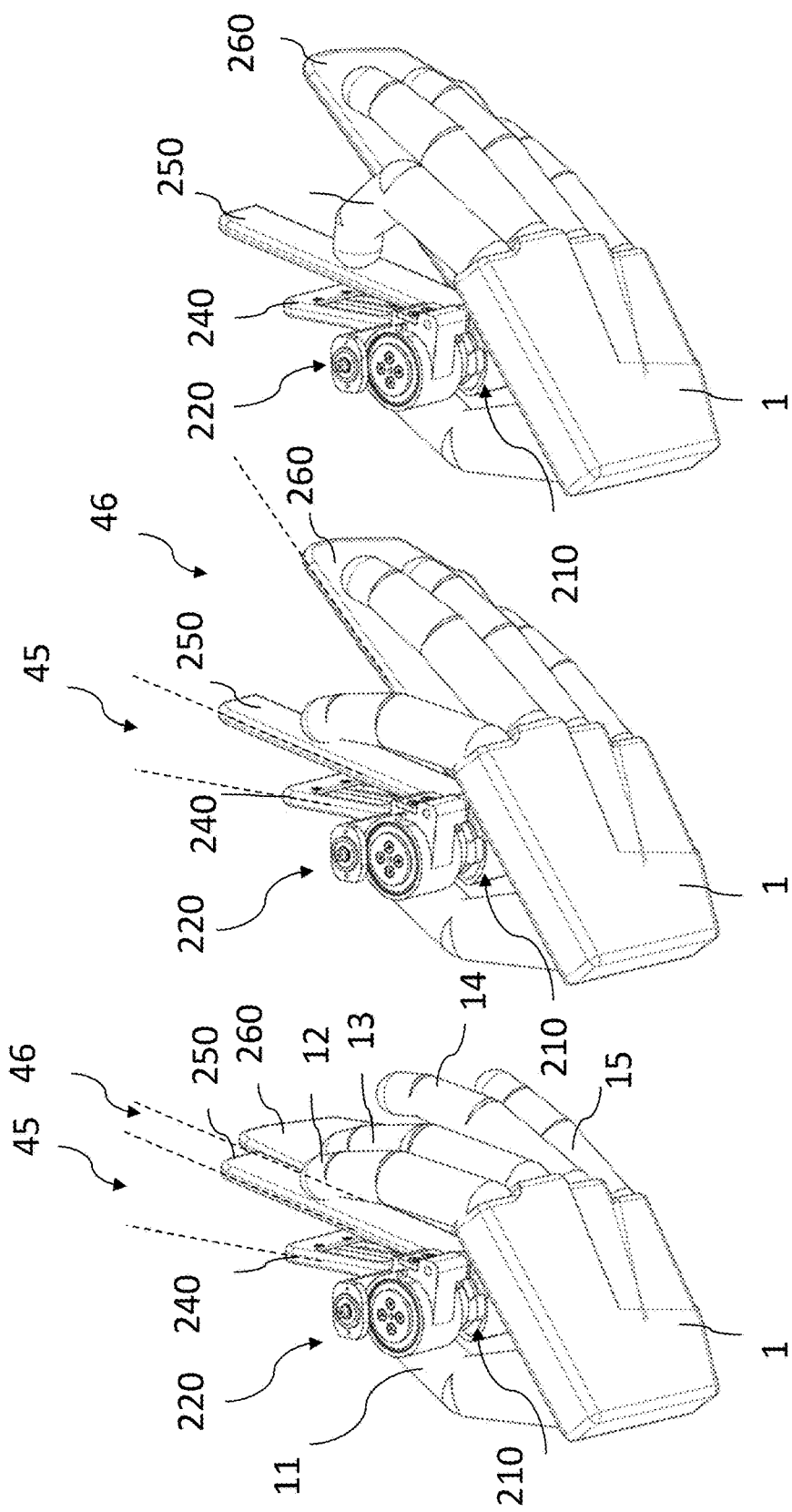

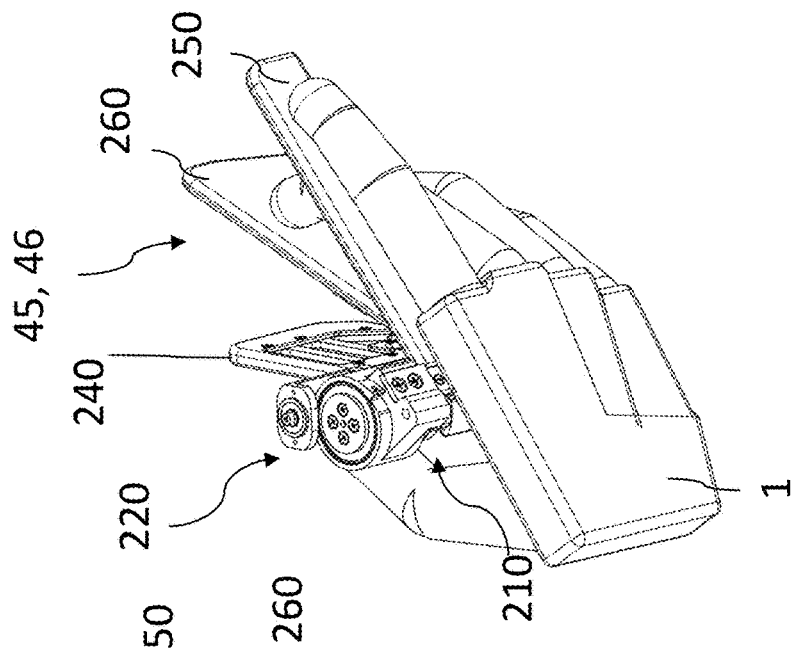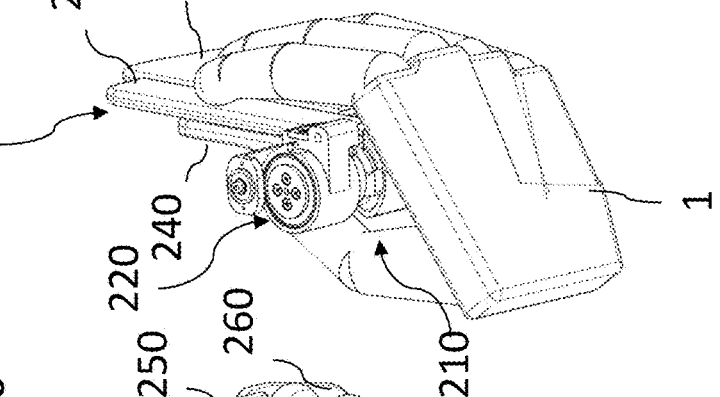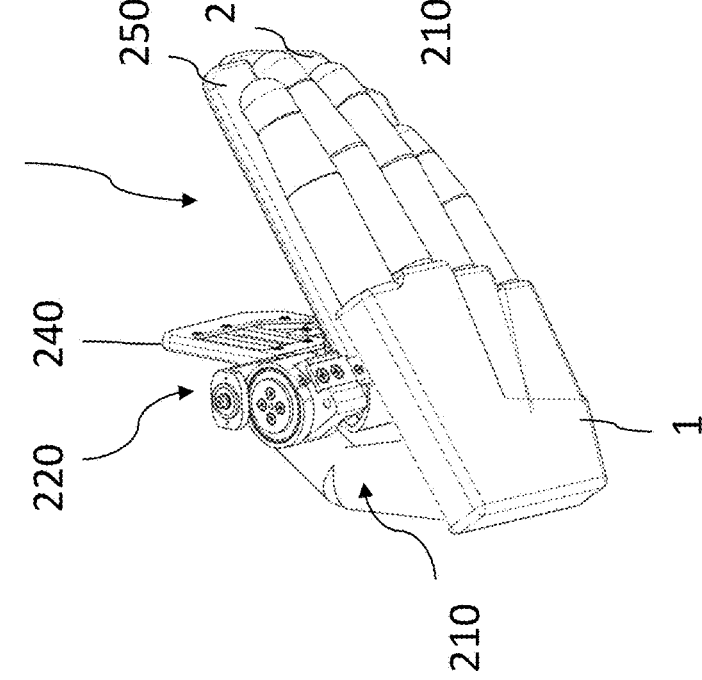

HAND CONTROLLER DEVICE

FIELD OF INVENTION

The present invention relates to a generic hand controller device for detecting a movement of one or more fingers of a user holding the generic hand controller device and for reflecting force to one or more fingers of said user.

A particular, but non-exhaustive, application of the invention lies in hand-remote control-ling devices or force reflective master devices for use in a force reflective master-slave system. FIG. 1 illustrates conceptually a bilateral teleoperation system based on a force reflective master-slave system in its most general form. Such force reflective master devices 2 provide a touch-feeling through force reflection to the operator's hand 1 in a master slave bilateral control 3. Human finger motions are detectable by the master device 2 and can be mapped onto various mechatronic and/or virtual slave devices 4 (such as robot grippers, robotic dexterous hands, simple or multi-purpose mechatronic grippers or prosthetics de-vices). During the control procedures, the forces and torques that appear from interactions between a controlled slave device 4 and its environment 5 can be fed back to the operator's hand and fingers 1 to provide the operator with remote tactile and kinesthetic perception.

BACKGROUND

Master-slave systems have been proposed for use in telerobotics to perform tasks on remote or dangerous locations, such as in a nuclear-, (deep) sea-, or space environment. Another important application scenario lies in the medical field, where hand-controlled master devices are used in remote or proximity medical surgery, e.g. as a hand interface for minimal invasive surgery coupled with surgery robots.

Several solutions have been proposed in the art. The devices shown in Nakagawara et al. (S. Nakagawara, H. Kajimoto, N. Kawakami, S. Tachi, and I. Kawabuchi, "An encounter-type multi-fingered master hand using circuitous joints," in IEEE Int. Conf. Robotics and Automation ICRA, April 2005, pp. 2667-2672), or Fontana et al. (M. Fontana, A. Dettori, F. Salsedo, and M. Bergamasco, "Mechanical design of a novel hand exoskeleton for accurate force displaying," in Proc. IEEE Int. Conf. Robotics and Automation ICRA. Piscataway, N.J., USA: IEEE Press, 2009, pp. 2599-2604) 2) can be placed directly on the user's fingers and hand. However, such master devices do not only cover the hand, but also the wrist. According to the solution proposed in Hasegawa et al. (Y. Hasegawa, Y. Mikami, K. Watanabe, and Y. Sankai, "Five-fingered assistive hand with mechanical compliance of human finger," in IEEE Int. Conf. Robotics and Automation ICRA, 2008, pp. 718-724), even the user's arm is partly covered.

Disadvantages of such hand master devices are limited compatibility with arm master de-vices due to arm coverage, low comfort, fatigue, high mass and size. These drawbacks can be partly relieved by locating bulky components such as actuators externally. For instance, a hand exoskeleton, where cable transmissions are used to locate the actuators away from the hand and arm is proposed in A. Wege and A. Zimmermann, "Electromyography sensor based control for a hand exoskeleton," in Proc. IEEE Int. Conf. Robotics and Biomimetics ROBIO, 2007, pp. 1470-1475. While such a solution can increase power density at the actuated joints, such designs are prone to suffer from mechanical losses, reduced backdrivability and backlash. Furthermore, external connections interfere with potential arm masters {to which they might be attached} or might constrain the arm workspace and mobility. Another drawback of the proposed solutions is that their use is optimized for a specific type of slave device and that the operability of the master device of varying slave devices is rather limited. Likewise, the complex and bulky constructions make it difficult to adjust the hand master device to varying operators with different hand/arm/finger sizes.

Another drawback of the proposed devices is that they are resource expensive and that the complicated mechanisms are susceptible to mechanical losses and misalignments that may lead to unnatural constraint forces and consequently uncomfortable wear and operation. The achieved device and user performance, such as the controlling accuracy, wearing comfort, etc., can therefore be low compared to the resources expended, such as material costs, complexity of required mechatronic components etc.

SUMMARY OF THE INVENTION

In view of the above problems of the prior art, the present invention seeks to provide a hand controller device with a more resource-efficient design that can be used by varying operators without requiring device adjustments for interaction with different operators. It is a further object of the invention to provide a device that is usable in different bilateral control architectures and in combination with a large variety of dissimilar slaves.

The invention is set forth and characterized according to the subject matter of the independent claim 1, while the dependent claims describe preferred embodiments of the invention.

A hand controller device suitable for use in a force reflective master-slave system is pro-posed that comprises a device body and opposing first finger supporting means and second finger supporting means. A hand controller device in the context of this invention is a device that can be gripped and held by a human hand. The first finger supporting means provides support for a user's thumb and the second finger supporting means provides support for one or more of the user's remaining fingers. The finger supporting means are coupled to a support structure. The support structure pro-vides support to the movable components of the hand controller and may comprise a device body to which both finger supporting means are mounted or two separate support components, one for each finger supporting means. At least one of the finger supporting means is movably coupled to the device body so that a movement of the pivotable finger supporting means increases or reduces an opening angle and/or a distance between the opposing first and second finger supporting means.

The hand controller device further comprises a force and/or torque generation means to generate a force and/or torque between the first and second finger supporting means. The force and/or torque generation means generates a torque and/or force on the at least one pivotably mounted opposing finger supporting means so that the torque causes the rotatable finger supporting means to pivot away or towards the opposing finger supporting means, thereby increasing or reducing the opening angle there between. The force and/or torque generation means may be used for force and/or torque feedback from a slave device. The terms force and torque are used exchangeably throughout this text. The opening angle between opposing finger supporting means can also be changed by a grasping movement of the user's hand when the user's fingers are placed on the hand controller device.

In accordance with an aspect of the invention, the at least one movable finger supporting means may be pivotably coupled to a device body that serves as the support structure such that a rotation of the pivotable supporting means (250, 260) increases or reduces an opening angle between the opposing first (240) and second finger supporting means (250, 260). In accordance with this aspect, both finger supporting means may extend outwardly from the device body.

According to an aspect of the invention, the device body and the finger supporting means may be shaped and dimensioned such that the device can be grasped by a hand of a user. In a grasped state, the device is positionable so that the device body or support structure can be surrounded by the user's palm and a thumb of a user can be placed on an outer surface of the first finger supporting means and one or more of the other four fingers can be placed on an outer surface of the at least one second finger supporting means. In accordance with a further aspect of the invention, the support structure may be positioned such that it contacts the dorsal side of the user's hand when a thumb of a user is placed on an outer surface of the first finger supporting means and one or more of the other four fingers are placed on an outer surface of the at least one second finger supporting means.

In other words, the hand controller comprises a support structure or device body for contacting the user's palm and/or the dorsal side of the hand and a finger supporting means that is intended for being encompassed or touched by the user's fingers. Preferably, the force and/or torque generation means is integrated at least partly into the device body leading to a compact hand controller device and avoiding the need for actuators that are positioned on the user's arm or outside cable transmissions constraining the mobility of the user's finger or arm when using the device.

In accordance with an aspect of the invention, the first finger supporting means and the second finger supporting means may comprise finger detecting means configured to detect whether or not a user's finger is in contact with a surface of the first and/or second finger supporting means.

The combination of a finger supporting means on which the user's finger are freely movable and are thus not fixed or otherwise constrained thereon with an integrated sensor means for detecting whether or not a user's finger is in contact with the surface of the finger supporting means results in an easy-to-use hand controller with reduced complexity compared to prior art devices.

In accordance with an aspect of the invention, the finger detecting means may be further configured to determine a varying location of a user's finger, e.g. the varying location of the user's fingertip, on the surface of the first and/or the second finger supporting means when the finger is in or near contact with one of the finger supporting means. Likewise, it is beneficial for the finger detecting means to be configured to associate the detected location to one or multiple of the five fingers of the user's hand. A user can thus operate the hand controller by selectively touching the surface of the finger supporting means with one or more selected fingers and/or sliding one or more fingers along the surface. These touch contacts or finger movements on the surface are detected by the finger detecting means and may be used to determine an estimated grasp configuration of the user, or to map to a predetermined grasp movement of the salve, mapped to a predetermined grasp movement of the user or for determining the feedback force magnitude to apply to the fingers through the finger supporting means. It will be appreciated that the proposed hand controller may also be realized without any finger detecting means but only with a force and/or torque generation means.

According to a further aspect of the invention, the detected location of the finger, e.g. the fingertip location, on the first or second finger supporting means is used to adjust the force and/or torque generated between the first and second finger supporting means. Preferably, the generated force and/or torque is adjusted such that the perceived force feedback remains constant when a user's finger is moved along the surface of a finger supporting means. This has the advantage the changing lever action due to the movement of the finger on the finger supporting means is compensated. This allows for decoupling the force feedback magnitude from the fingertip location on the finger supporting means.

According to a further aspect of the invention, the finger supporting means may comprise a straight or curved plate for supporting one or more of the user's fingers. A curved plate as defined in this invention could include all possible combinations of 3D curvatures. Preferably, the straight or curved plate has a smooth surface so that a user's finger can be slidably positioned thereon which allows for an intuitive human machine interface since the user's fingers are not fixed to or constrained by the finger supporting means.

It is beneficial if the finger detecting is a multi-touch sensing means configured to deter-mine one, two or more points of contact with the surface of the second finger supporting means. By way of example, the multi-touch sensing means may be realized as one or more resistive linear position sensors placed on the surface of the finger supporting means. Alternatively, one or more capacitive position sensors as used in multi-touch displays may be used. Other sensing means such as optically detecting the points of contact using a camera or pressure/force sensing arrays applied to the finger supporting means surfaces may also be used. The multi-touch sensing means can detect touch patterns using multiple fingers that are then mapped to corresponding predetermined grasp gestures of the user.

The first finger supporting means may be mounted non-rotatably to the device body for supporting a thumb of a user so that only a drivetrain mechanism for the second finger supporting means needs to be provided.

In accordance with an aspect of the invention, the second finger supporting means may comprise 1, 2, 3 or 4 finger levers being mounted adjacent to each other to the device body. Each finger lever is pivotably coupled to the device body around a rotation axis. The finger detection means may include sensors provided inside and/or on a surface of each lever. The finger levers providing support for the index, middle, ring and little finger can thus be dimensioned to provide space for a single or alternatively, for a group of fingers. By way of example, the second finger supporting means may comprise two separate finger levers, e.g. realized as pivotable plates. The first finger lever is dimensioned to accommodate the user's index finger whereas the second finger lever is dimensioned to accommodate the middle, ring and little finger. In order to be large enough to accommodate three fingers, the second finger lever of the second finger supporting means may have a width in direction of the rotational axis that is preferably at least two times or three times, larger than a width of the adjacent first finger lever.

Multiple fingers can thus be grouped onto a single finger lever. The finger detecting means, if configured to detect contact and location of a touch movement can identify which of the grouped fingers was used based on the identified touch pattern. Other variations of separating the second finger supporting means for grouping haptic finger support may be realized. By way of example, separate finger levers for the index and middle finger may be provided while the ring and little fingers are grouped on a single finger lever. Alternatively, only a separate finger lever for the index and for the middle finger may be provided while no support lever for the ring and little finger may be provided. For less complex slave devices, it may also be beneficial to group all four fingers (except for the thumb) on a single finger lever. In this case, the shape of the first fingers supporting means may be identical to the shape of the second finger supporting means.

By enabling different grouping options for haptic finger support, the present invention exploits a psychophysical effect referred to as "enslaving of the fingers" that is leading to coupled finger force perception and activation. Force production with an instructed finger tends to result in force production in adjacent uninstructed fingers during voluntary con-traction. Such "enslaving effects" are more evident in ring and little finger activity, while the index finger is the least affected by enslaving effects. By way of example, this enslaving effect can thus be exploited by providing a separate lever for the index finger while grouping fingers that are more prone to the enslaving effect.

Grouping fingers on a single supporting lever can reduce the number of degrees of freedom (DOFs) for providing force feedback to the fingers (reduced slave device observability) while at the same time, the number of observed variables for providing a control input to the hand controller, e.g. for controlling a slave device, may remain high. By way of example, a hand controller with two pivotable finger levers, one for the index finger and one for the middle, ring and little finger, may provide four feedback variables to the hand controller. The feedback variables may indicate the forces between the thumb lever and each of the two finger levers and the position of each finger lever relative to the thumb lever, i.e. the opening angle between the rotatably fixed thumb lever and the index finger lever and the opening angle between the thumb lever and the grouped finger lever. However, by providing sensing means on the thumb lever and each finger lever that is also configured to discriminate between the grouped fingers, at least 15 input variables may be observable in the input channel. For instance, for each of the five fingers, a variable may indicate the contact/no contact value and the position in two-dimensions (X, Y-coordinates) on the surface of a finger lever. Thus, the input variables allow for full intuitive hand control of dexterous mechatronic grippers.

It is an advantage of the invention that at least some control variables in the input channel, i.e. the variables for detecting the finger movements and grasps to control the slave device, may be detected independently from the feedback variable for providing a force feedback to the hand controller. The fingertip location may be measured and this information may be used to adjust the force feedback between the first and second finger supporting means such that the perceived force feedback remains constant when a user's finger is moved along the surface of a finger supporting means. Thus, the proposed hand controller may be used as a force reflective master device wherein a finger is free to move, while the device feeds back forces from the slave. In other words, whether or not a user's finger is in contact with the surface of the first finger supporting means and/or with the surface of the second finger supporting means may be detected independently of whether or not the pivotable finger supporting means is rotated. Thus, the finger sensing function can be separated and decoupled from the movement of the finger supporting means, and thus from the force reflection function. It is therefore possible to reduce the number of degrees of freedom (DOF) of the force and/or torque generation means or the number of DOFs of the force feedback while the number of observed variables for controlling the slave devices can be kept high.

Through the above described asymmetry and decoupling of the observability and controllability functions, improvement of achievable force feedback quality, and a more rich sensing of hand and finger locations for dexterous remote control of mechatronic gripper is achieved while reducing the mechanical complexity, overall mass and volume of the device.

In accordance with a further aspect of the invention, the force and/or torque generation means may comprise a Capstan transmission with which a nearly loss-free gear reduction can be realized. In accordance with a further aspect of the invention, the force and/or torque generation means may comprise for each pivotably mounted finger supporting means: a motor that is coupled to one of the finger supporting means to generate a torque and/or force on the finger supporting means. The motor or the drive train of the torque and/or force generation means may be integrated at least partly into the device body or may be located outside thereof. Preferably, the motor is positioned partly inside the Capstan transmission. The proposed hand controller device is therefore compact in size and the drivetrain components may be located inside the user's palm or dorsal to the user's hand instead of locating them on the arm or fingers. Preferably, the device body is substantially cylindrical in shape.

In accordance with a further aspect of the invention, the hand controller may comprise a force and/or torque sensing means provided between the support structure and the finger supporting means in order to determine a force and/or torque between the finger supporting means. With this arrangement of the force and/or torque sensing means, the dynamics and non-linearities of friction of the drive and gear-train included in the force/torque generation means can be effectively compensated.

In accordance with a further aspect of the invention, the device may be configured as a force-/torque-reflective master device for hand remote-controlling a slave device, wherein the device is configured to map detected contact points on the surface of the first and second finger supporting means as control outputs to predetermined input channels of a slave device, and wherein the force and/or torque generation means of the master device is configured to receive force or torque feedback commands from the slave device to generate a force or torque between the first and second finger supporting means.

Instead of an active force and/or torque generation means based on a motor, the force and/or torque generation means may also be based on a passive force and/or torque generation means. By way of example, it could be based on a locking mechanism with a restoring force, such as a spring, brake coupled to a spring, or a variable damper.

In accordance with a further aspect of the invention, the first finger supporting means may be coupled to a first support structure for supporting a user's thumb when positioned between the first finger supporting means and the first support structure; and the opposing second finger supporting means may be coupled to a second support structure for supporting one or more of the user's remaining fingers when positioned between the second finger supporting means and the second support structure; wherein at least one of the finger supporting means is movably coupled to its support structure so that a movement of the movable finger supporting means increases or reduces a distance between the opposing first and second finger supporting means; and wherein the force and/or torque generation means is mounted to the first and/or second support structures. In accordance with this aspect, the first and second finger supporting means are not coupled to a central device body but to two separate support structures. Preferably, the first and second finger supporting means are coupled to their support structures with a four-bar linkage structure.

In accordance with a further aspect of the invention, the hand controller device may comprise a guiding means provided between the first and second finger supporting means along which the finger supporting means are movable. The guiding means guides a parallel movement of the movable finger supporting means that increases or reduces a distance between the opposing first and second finger supporting means In accordance with this aspect, the guiding means and the force and/or torque generation means may be attached to a protruding portion of the support structure and are thus also located between the first and second finger supporting means. Thus, in a grasped state of the hand controller in accordance with this aspect, both the finger support means and the force and/or torque generation means is surrounded by the user's palm and the user's thumb can be placed movably on an outer surface of the first finger supporting means and one or more of the other four fingers can be placed movably on an outer surface of second finger supporting means 1250.

The present invention is particularly suitable as a master device for use in a force reflective master-slave system. By way of example, the proposed hand controller could be used as a multi-purpose gripper controller for real-time robotic telemanipulation in space missions to reduce the exposure of a crew to the external environment. The invention finds also application in numerous terrestrial application contexts that include remote handling operations, de-mining operations, medical remote surgery, or under-water robotics operations. However, it should be clear that the invention is not restricted to the use of the device as a master device in force reflective master-slave systems. For example, the proposed hand controller could also be used as a stand-alone rehabilitation device, i.e. not being connected to a slave device, for use in medical rehabilitation and physical therapy to assist in rehabilitation of hand and finger movement of a patient.

BRIEF DESCRIPTION OF THE DRAWINGS

The invention is explained below in an exemplary manner with reference to the accompanying drawings, wherein

FIGS. 5A-5F illustrate exemplarily typical finger and pinching control motions of a user's hand when using a hand grasp master device according to an embodiment of the present invention;

DETAILED DESCRIPTION OF THE DRAWINGS

Figure 1:
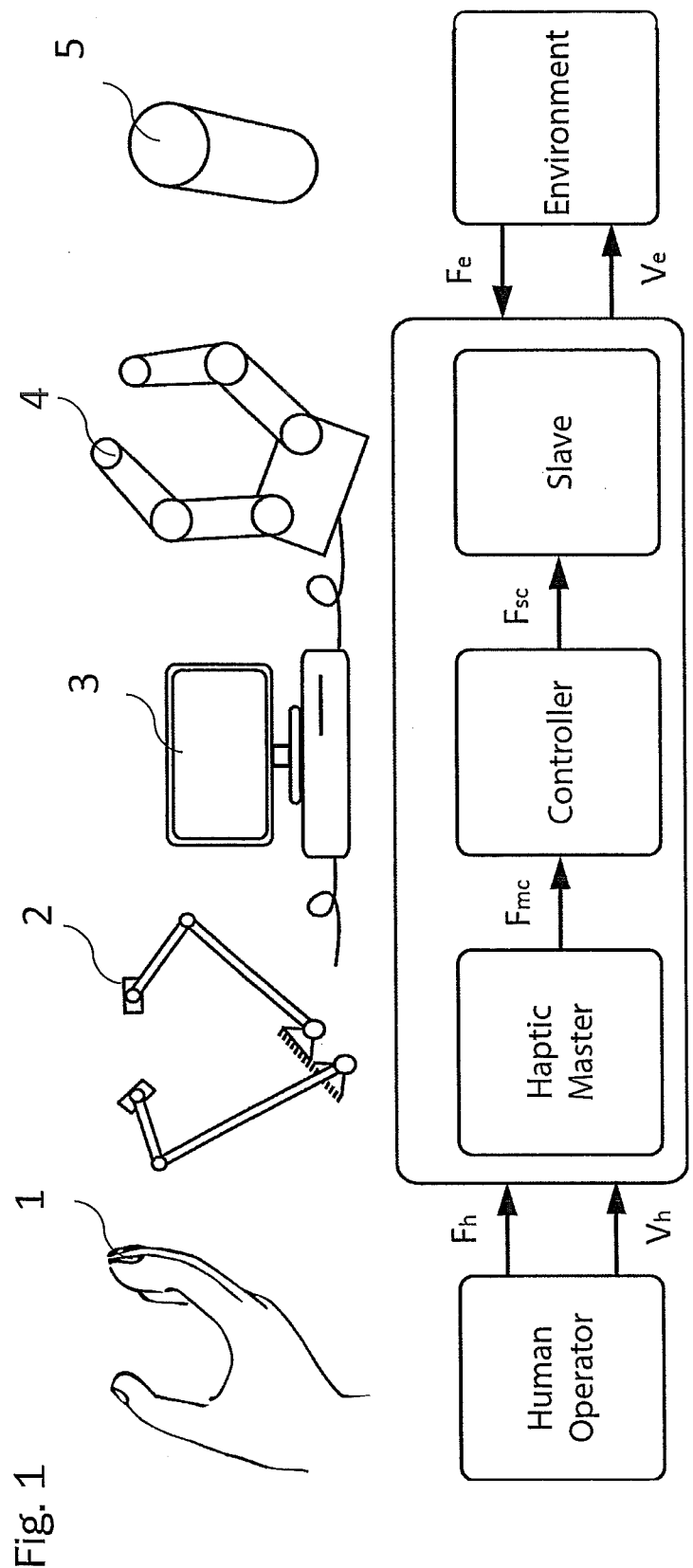
FIG. 1 illustrates conceptually a bilateral master-slave teleoperation system.
Figure 2A:
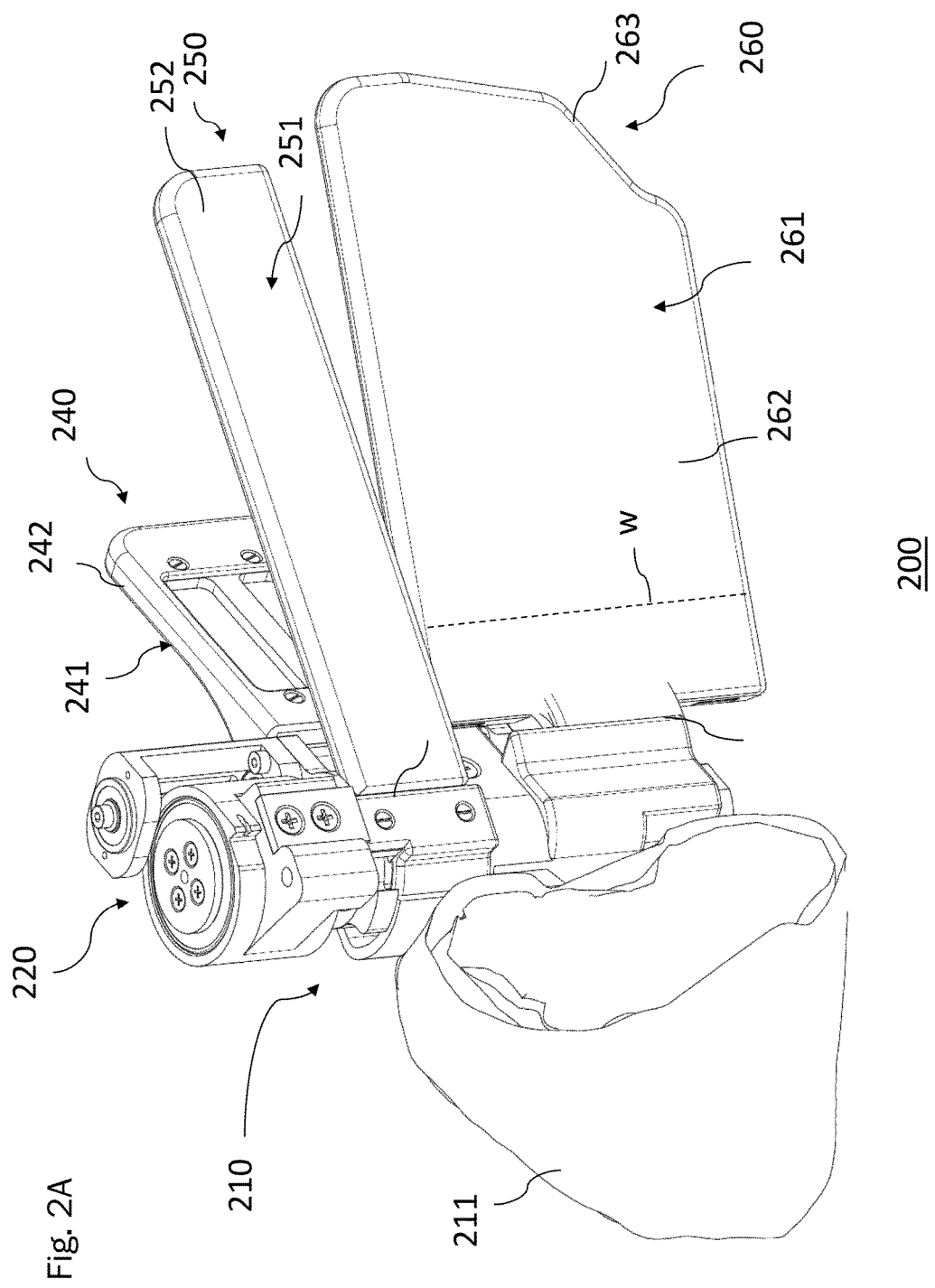
FIGS. 2A, 2B show a front and back view of a hand grasp master device according to an embodiment of the present invention.
Figure 2B:
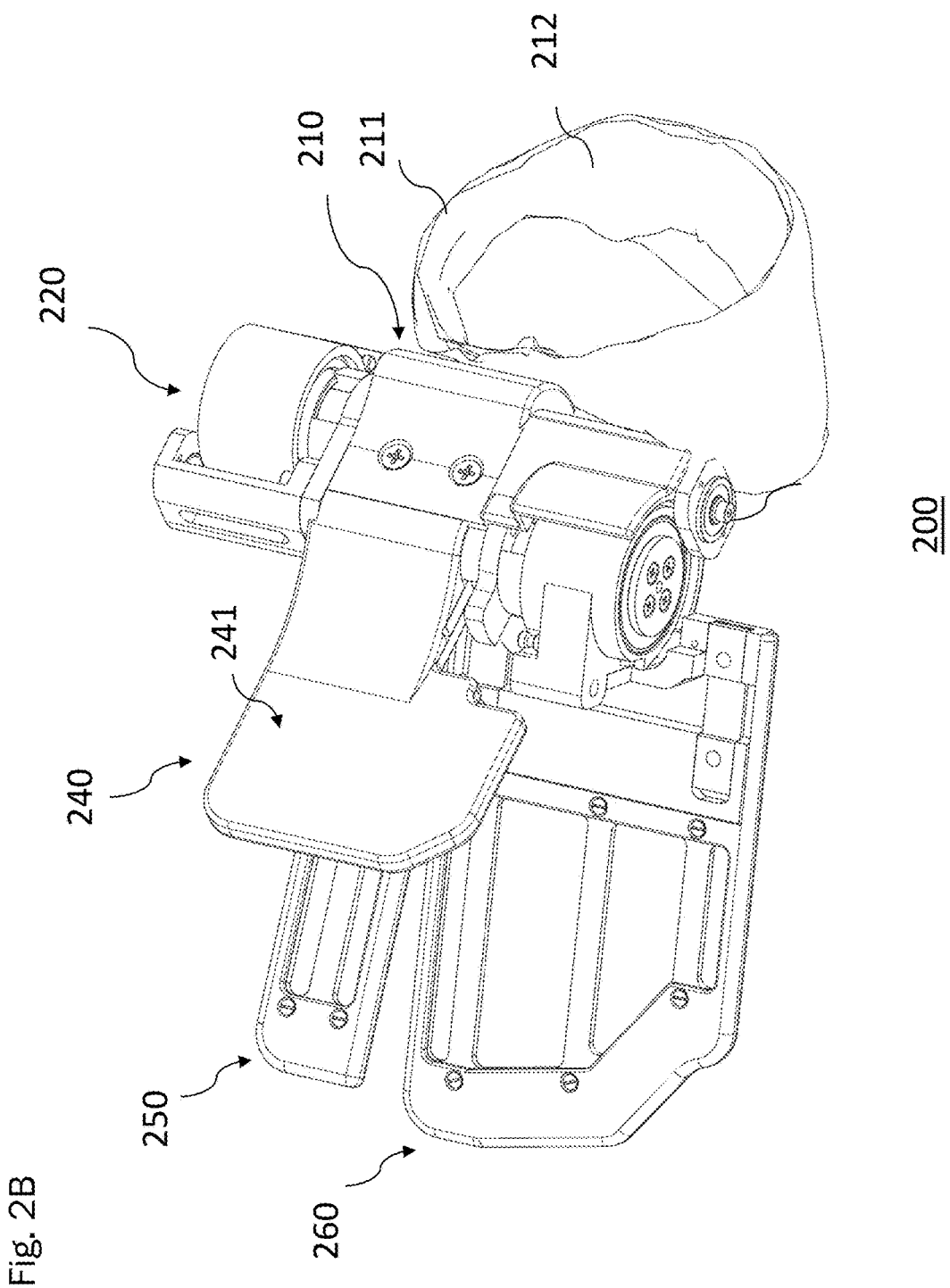

FIG. 2A and FIG. 2B show a front and back view of a hand controller device according to an embodiment of the present invention. The hand controller 200 comprises a device body 210 including a hand support 211, and three finger levers 240, 250, 260 for providing support to the thumb, index finger and grouped middle-, ring-, and little finger, respectively of a user's hand (not shown). The device body serves as the mechanical support structure. Each of the finger levers 240, 250 and 260 comprises a plate 242, 252 and 262 that extends outwardly from the device body. The thumb lever 240 is mounted non-rotatably to the device body 210, whereas the index finger lever 250 and the grouped finger lever 260 are mounted pivotably to the device body. The width of the grouped finger lever 260 (illustrated with the dashed line w in FIG. 2A) is about three times as large as the width of the index finger lever to accommodate three fingers thereon. The grouped finger lever 260 has a concave, beveled cutout portion 263 at an outer end portion considering the reduced length of the ring and little finger. FIG. 2A shows the outer surface of the moving levers 250, 260 on which the fingers are positioned and the inner surface of the thumb lever 240, whereas FIG. 2B shows the inner surface of the moving levers 250, 260, but the outer surface of the thumb lever 240. FIG. 2B shows the side of the thumb lever 240 that is rigidly connected to the device body 210.

The hand support 211 is intended for positioning and holding the device 200 in the hand. In order to use the hand controller 200, an operator's hand slides through the hand support 211 in order to place the fingers on the corresponding levers (not shown in FIGS. 2A and 2B). No significant reaction force is reflected to the hand support since in the supported pinch grasping motions the force ground resides at the thumb to provide useful reaction force. The hand support 211 only contacts the steady part of the palm and the dorsal side of the hand (not shown in FIGS. 2A and 2B), avoiding contact with joints and phalanges to ensure that the workspace is not limited. The hand support 211 should allow comfortable donning/doffing and operation to different hand sizes by using a quick fixture such as a hook-and-loop fastener on the dorsal side. The operator's right hand slides in through the hand support 211 such that the palm and dorsal side of the hand contact the inner surface 212 of the hand support 211 and the fingers rest freely on the outer surface 251, 261 of the corresponding levers 250, 260. The fingers may remain unconnected from the hand controller in contrary to known prior art devices where the fingers connect to the device on one or multiple predetermined positions. The proposed design offers comfortable operation and the possibility to reposition fingers, or to exclude these from grasps performed.

The device body 210 has an elongated shape and comprises a force and/or torque generation means 220 to generate a force between the opposing finger levers. In case of the embodiment shown in FIG. 2A and FIG. 2B, the force and/or torque generation means comprises two drivetrains to provide a torque to the index lever 250 and the grouped finger lever 260. Each drivetrain comprises a motor, an encoder, a planetary gear and a capstan transmission that is coupled to a finger lever. The drivetrain for the index finger lever 250 is mounted at the upper half and the drivetrain for the grouped finger lever is mounted at the lower half being 180° rotated. The shown drivetrain configuration results in a compact, elongated shape of the device body 210.

Figure 3:
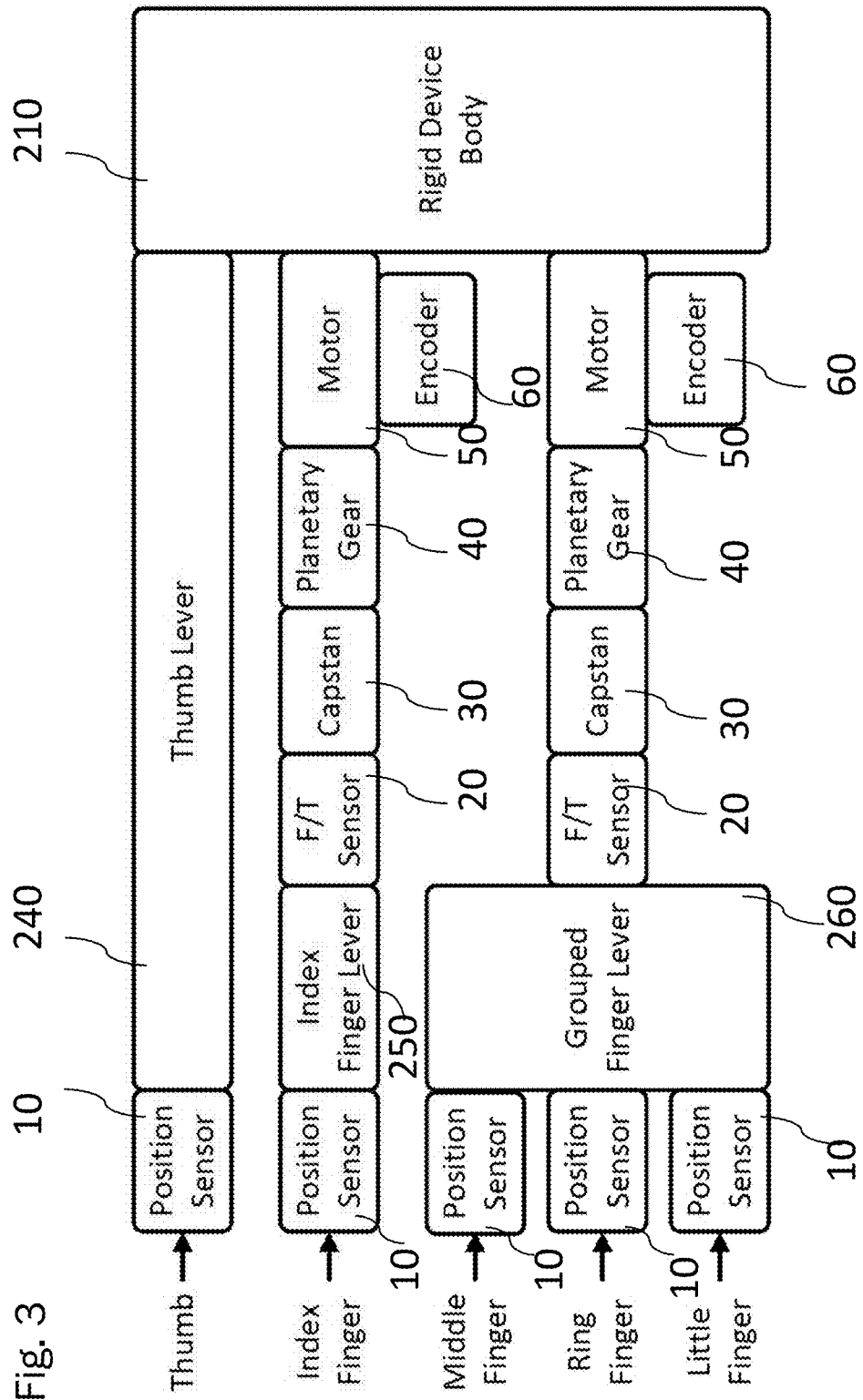
FIG. 3 shows a block diagram illustrating schematically the functional components of the device of the embodiments shown in FIGS. 2a, 2B and 4.
Figure 4:
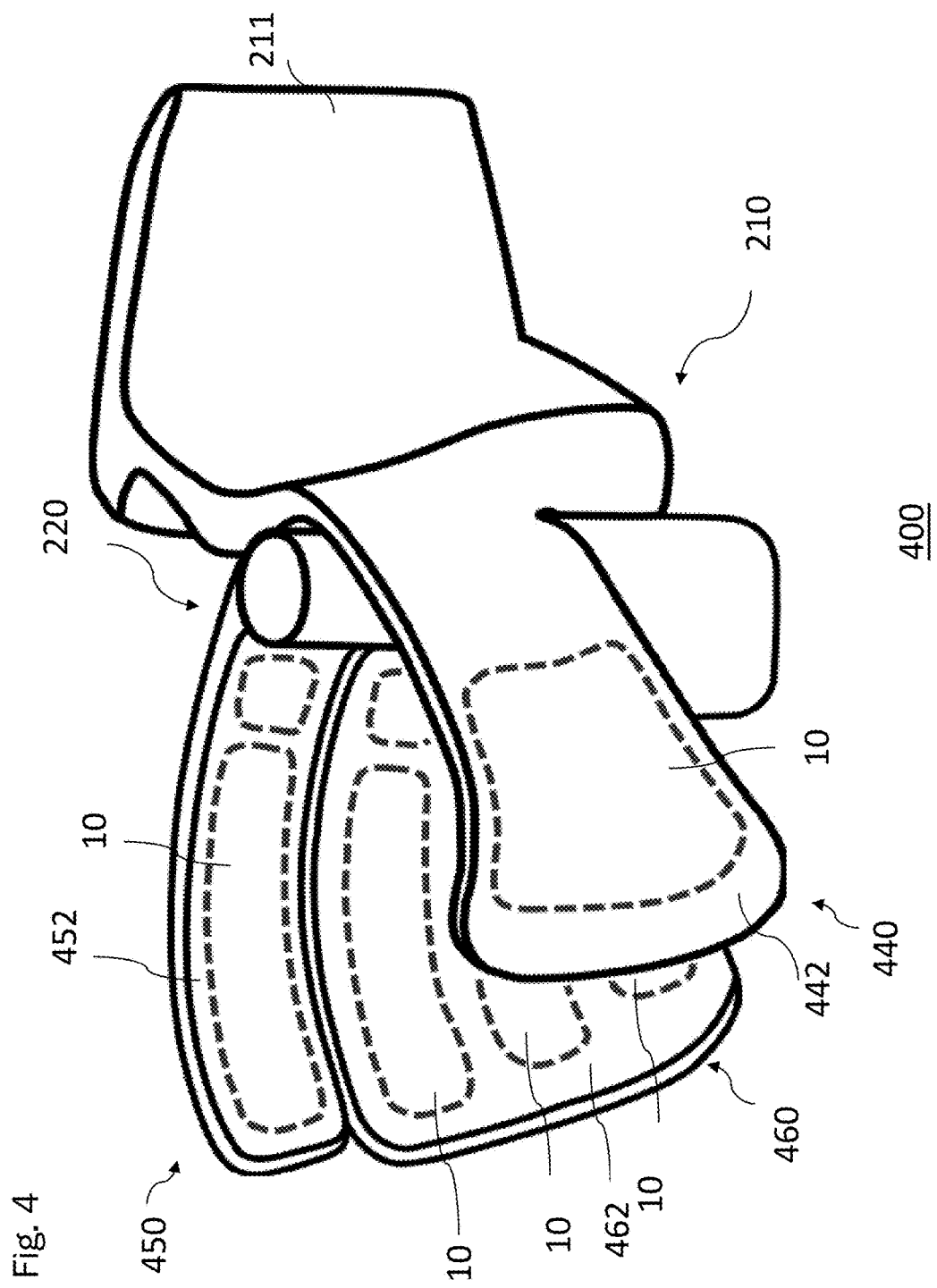
FIG. 4 shows a hand controller device structure according to another embodiment of the present invention.

FIG. 3 shows a block diagram illustrating schematically the possible functional components of the device according to the embodiments shown in FIGS. 2a, 2B and 4.

The thumb lever 240 is rigidly connected to the device body 210 and thus, is not coupled to a drivetrain mechanism. The index finger lever 250 and grouped finger lever 260 both are coupled to a full drivetrain, including a motor 50, a gearhead 40, an encoder 60, and a Capstan transmission 30. The drivetrain thus generates a torque between the pivotable finger lever and the rigid thumb lever and can be used as a force and/or torque feedback mechanism to provide kinaesthetic feedback to the hand controller, e.g. from a slave device.

In this particular embodiment, each pivotable lever 250, 260 is actuated by a brushless motor 50 (13 mm diameter, 12 Watt, including Hall sensors) with a planetary gearhead (26:1 reduction ratio) and an encoder (256 counts/turn). The motors are controlled by a drive unit. An advantage of the motor type used is its small size, low mass, low torque ripple, and high power density. In addition, its thermal characteristics are specifically suitable for short term overloading. For the same purpose, the mechanical design ensures increased heat capacity and good conductive contact of plain aluminum components over the full length of the motor.

The levers can be connected via force and/or torque sensors 20 to the rigid device body 210 to allow sensing the finger interaction. The used bending beam sensors for the force and/or torque sensors 20 consist of a thin steel plate with 4 strain gauges mounted in a Wheatstone bridge configuration to sense bending deflection while rejecting components from torsion.

A position sensor 10 is provided on the surface of the thumb lever 240 to detect a user's finger on the surface of the thumb lever 240. In this particular embodiment, resistive membrane linear position sensors 10 are placed on the surface of the finger levers, functioning as a touch-sensitive linear potentiometer and allowing for custom shapes of the sensor surface to optimize detectability of the finger contact position and the finger movement on the surface. One position sensor is located on the thumb lever 240, one on the index finger lever 250, and three on the grouped finger lever 260 (one for each finger). It will be appreciated that other suitable sensor means, such as capacitive position sensors, may be used instead, providing more flexibility in placement and configuration while requiring more complex electronics. Any signal from such position sensors can be used to derive also the contact point orientation, when merged with model data and other sensor information from the hand haptic device. Thus, location information (position and orientation) of the contacting finger segment can be obtained.

FIG. 4 shows a hand grasp master device structure according to another embodiment of the present invention. Similar to the embodiment shown in FIG. 2A, the hand controller comprises a thumb lever 440, an index finger lever 450 and a grouped finger lever 460.

In this embodiment, the finger support levers comprises curved plates 442, 452, 462 so that the fingers can be positioned on a concave surface that is preferably ergonomically adapted to the human hand. The areas 10 in FIG. 4 surrounded by a dashed line illustrate the sensor areas of the finger levers for detecting finger contact and motion.

FIGS. 5A to 5F illustrate exemplarily a sub-set of typical finger and pinching control motions of a user's hand when using a hand grasp master device according to an embodiment of the present invention. The figures show that the device body 210 and the finger supporting means 240, 250, 260 are shaped and dimensioned such that the device can be grasped by a hand 1 of a user. In a grasped state, the device is positionable so that the device body 210 can be surrounded by the user's palm and a thumb 11 of a user can be placed on an outer surface of the thumb lever 240. The index finger 12 can be placed on an outer surface of the opposing index finger lever 250 and the remaining three fingers 13, 14, 15 can be placed together on an outer surface of the grouped finger lever 260.

FIG. 5A also illustrates the opening angle 45 between the thumb lever 240 and the index finger lever 250 and the opening angle 46 between the thumb lever 240 and the grouped finger lever 260 (see dashed lines in FIG. 5A and FIG. 5B). The opening angles are identical in the pinched position shown in FIG. 5A since the index finger lever 250 is aligned with the grouped finger lever 260. FIG. 5A shows a second finger lever for the group of middle-, ring-, and little finger. Since the fingers are not connected to the device, the middle finger is able to perform a pinching/grasping motion, while being supported by the lever. The ring and little finger here are not participating in the grasp and do not make contact. In FIG. 5B, now all fingers are participating in the grasp. FIG. 5B also shows a grasp position wherein the pinching on the grouped finger lever is reduced so that the grouped finger lever 260 pivots to an open position, resulting in a larger opening angle 46.

FIG. 5C shows a grasping motion in which the index finger is slid back along the index finger lever 250. This sliding movement is detectable by the sensor 10 integrated on the outer surface of the index finger lever 251. The outer surfaces 241, 251, 261 of the finger levers have a smooth surface so that a finger can be slidably positioned thereon. FIG. 5D. FIG. 5E and FIG. 5F illustrate three further grasping motions of the user's hand wherein FIG. 5D shows a fully opened position, FIG. 5E shows a fully closed position, and FIG. 5F illustrates a grasping motion in which the grouped finger lever 260 is pushed down whereas the index finger lever 250 is in an open position. Thus, in the state illustrated in FIG. 5F, the opening angle 45 between the thumb lever 240 and the index finger lever 250 is larger than the opening angle 46 between the thumb lever 240 and the grouped finger lever 260.

It will be appreciated that the proposed shape of the hand controller can be used conveniently by varying operator hand sizes. In particular, the device interaction for the embodiments shown in FIG. 5A to FIG. 5F have been successfully simulated for varying operator hand sizes ranging from 5th percentile female hands up to 95th percentile male hands as extreme cases to represent the whole 5th-till 95th percentile hand size range.

Figure 6:
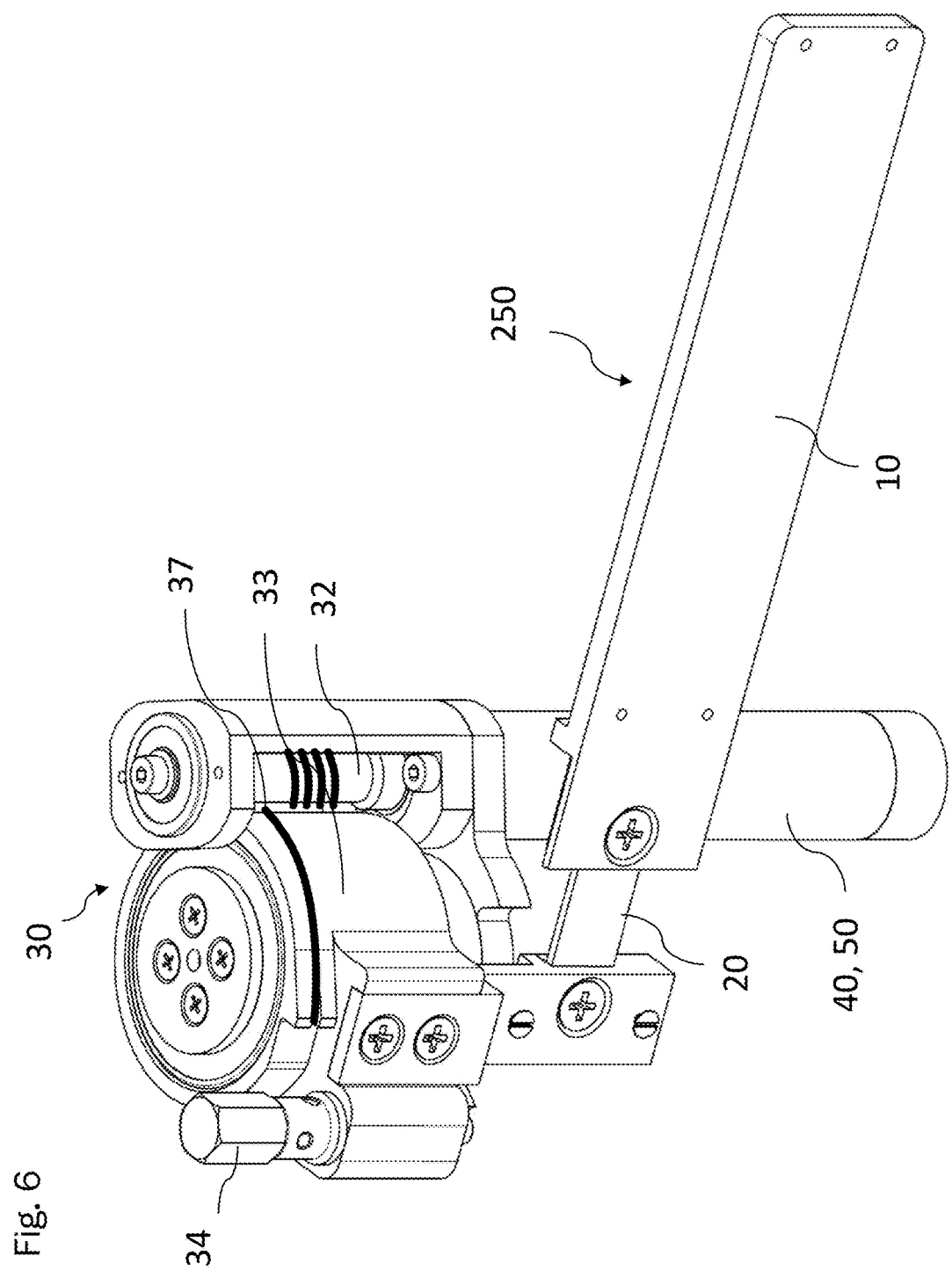
FIG. 6 shows a drivetrain of a finger lever according to an embodiment of the present invention.
Figure 7:
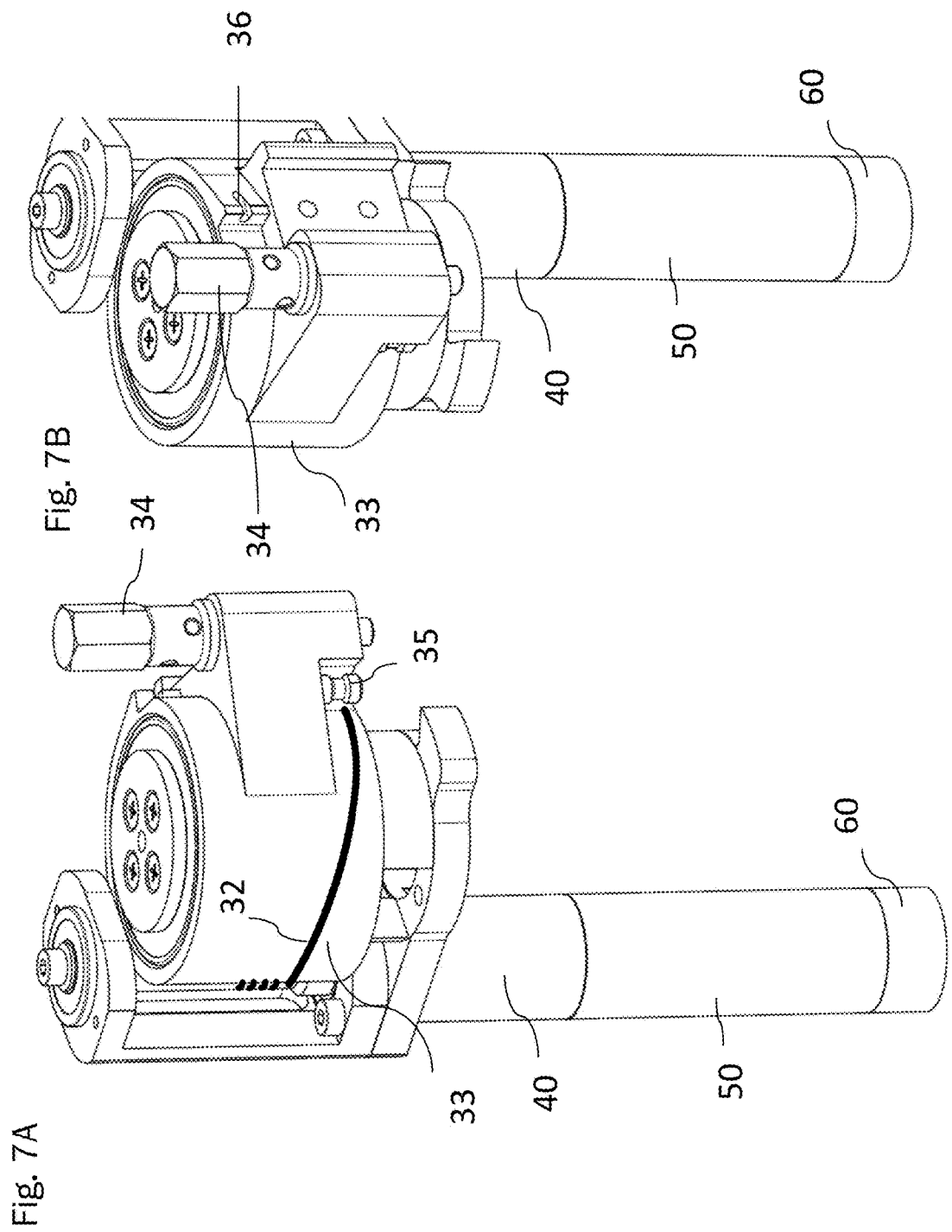
FIGS. 7A, 7B show perspective views of the Capstan transmission according to an embodiment of the present invention.

FIGS. 6, 7A, 7B and 8 show further details of the drivetrain of a finger lever according to an embodiment of the present invention. The drivetrain of each lever is composed of the actuator with gearhead, and a Capstan transmission 30. The motor-gear combination 40, 50 drives the low-diameter Capstan spindle 32 that on its turn drives the larger-diameter Capstan drum 33 by cable or other connecting means 37 onto which the lever 250 (or 260) is connected via the force/torque sensor 20. This is shown in FIG. 6 for the index finger lever 250.

Since miniature motors typically have low output torques, a considerable reduction ratio is required to achieve sufficient torque at the lever base. To avoid low efficiency and high backlash involved with multi-stage gearheads, a Capstan transmission 30, introducing negligible friction and backlash, was used in combination with a low reduction planetary gearhead 40. By way of example, a planetary gearhead 40 with reduction ratio 26:1 in combination with a Capstan reduction ratio of 5.5:1 was found as a suitable solution with a sufficiently small design achieving the required lever force and velocity. The increased structure size from the Capstan transmission 30 is mitigated by locating the motors 50 partially inside the free space in the capstan structure. This is also shown in FIG. 8 that illustrates how the actuators are shifted inside the Capstan transmission 30 for size reduction.

Figure 8:
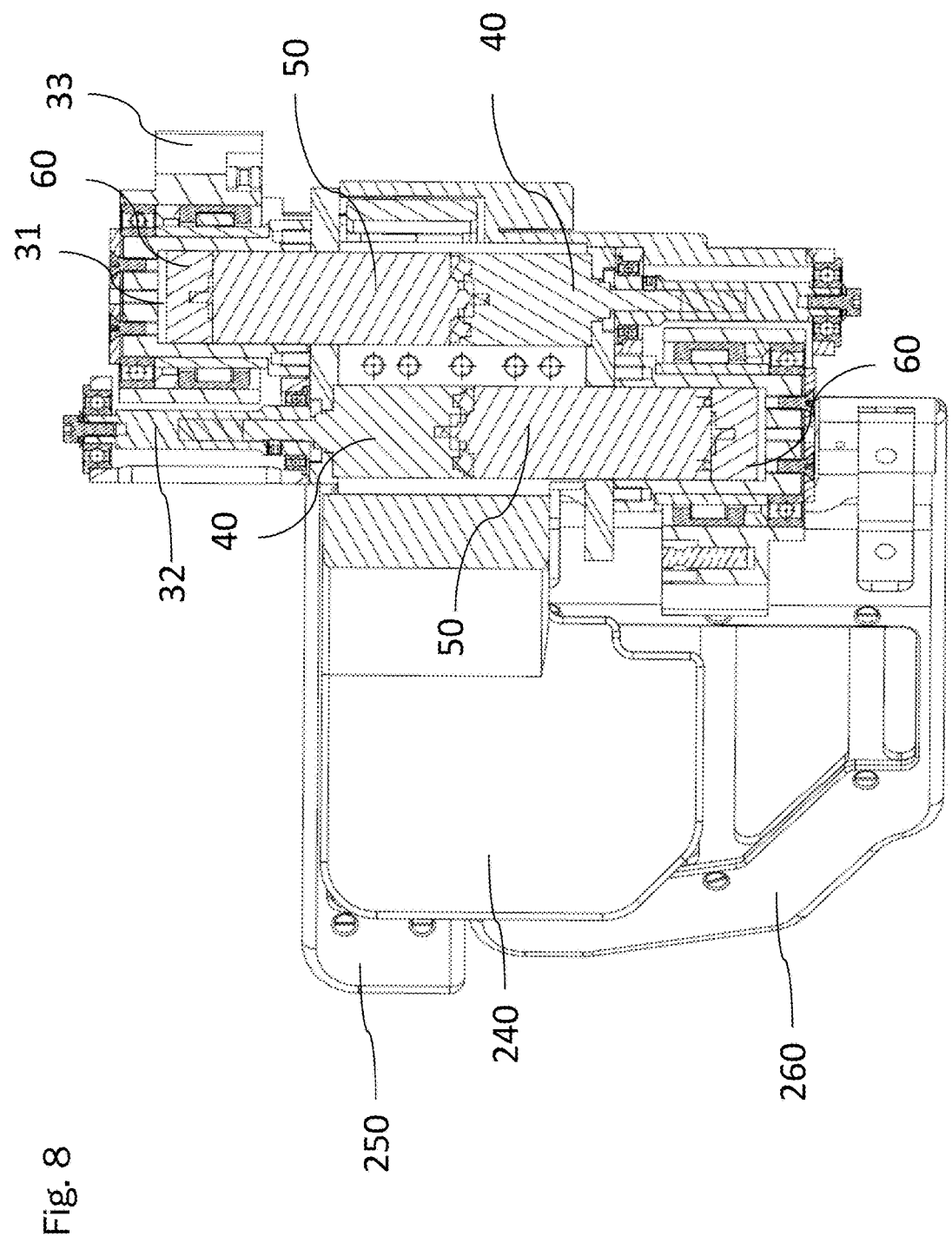
FIG. 8 shows a sectional view of a hand grasp master device according to an embodiment of the present invention.

FIG. 8 further illustrates the cross-section of the complete Capstan transmission 30. The gearhead output axis drives the Capstan spindle 32 (diameter 5.45 mm) and the spindle 32 drives the Capstan drum 33 (diameter 30 mm) via a tensioned cable wound multiple times around the spindle 32 and connected to the Capstan drum 33. The spindle 32 is suspended by two ball bearings to offload the motor shaft from high radial forces. The construction allows easy assembly/disassembly and axial pre-tensioning of the bearings. The Capstan drum 33 rotates around a fixed base with a ball bearing that constrains axial displacement and takes axial force components and a needle roller bearing to take the higher radial force components. A coated dyneema cable of diameter 1 mm having a specified tensile strength of 130 kg and low stretch of <1% connects the Capstan spindle 32 to the drum 33.

The hand controller was designed such that high cable tension can be achieved via a repeatable procedure. The cable is connected around a pin 35 at one end (cf. FIG. 7A) and is constraint with a steel pin, spliced through the cable, behind a small hook 36 at the other end (cf. FIG. 7B). For tensioning, the cable is wound around a cable tensioner 34 that can be rotated using a standard torque driver. Afterwards, the cable tensioner 34 can be removed for size and mass reduction.

FIGS. 9A to 9G illustrate schematically further embodiments of the present invention. The proposed concept for the hand controller device enables different grouping options for haptic finger support to optimally adapt the hand controller to different use cases or slave devices.

Figure 9B:
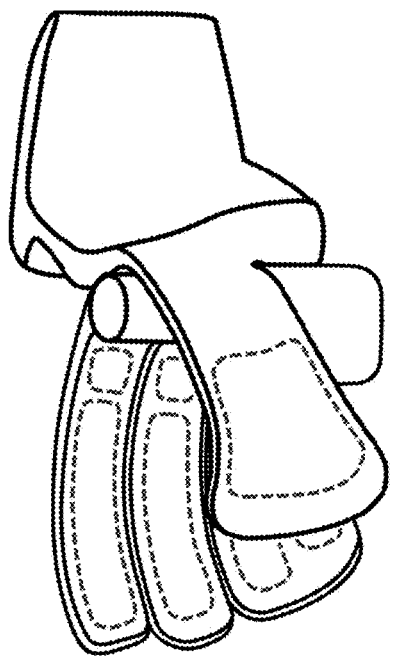
FIGS. 9A-9G illustrate schematically further embodiments of the present invention.
Figure 9D:
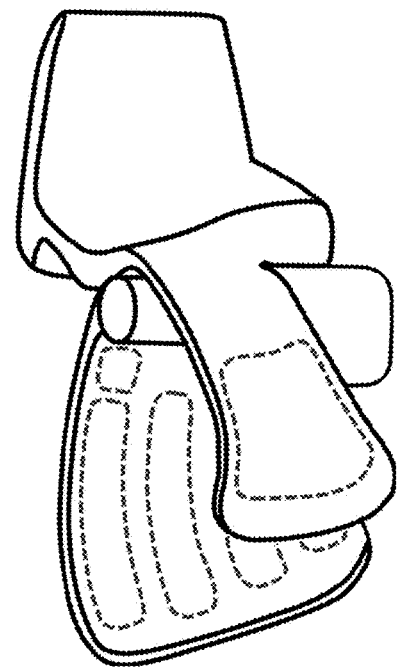
Figure 9A:
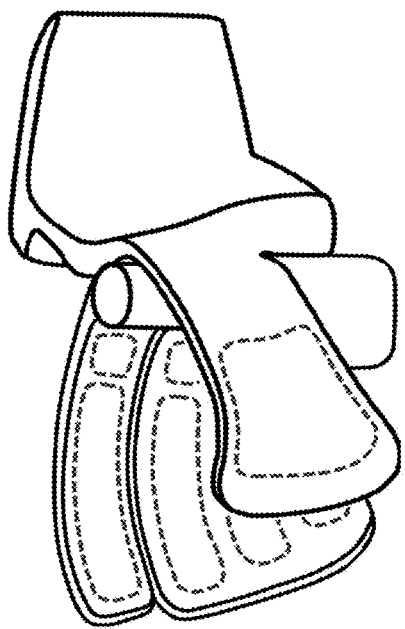
Figure 9C:
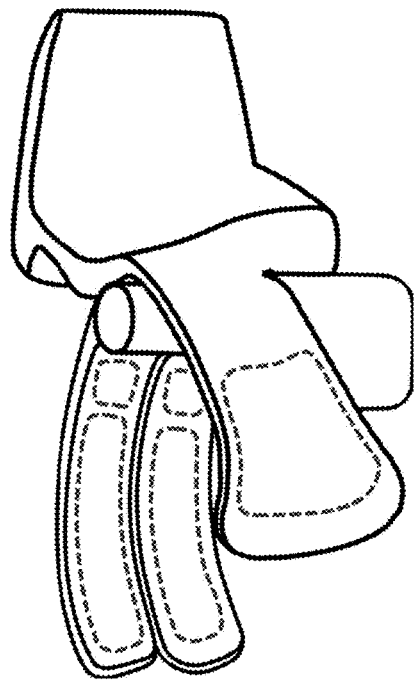

By way of example, separate finger support levers for the index and middle finger may be provided while the ring and little finger are grouped on a single finger lever (FIG. 9B). Alter-natively, only a separate finger support lever for the index and middle finger may be provided while no support lever for the ring and little finger may be provided (FIG. 9C). For less complex slave devices, it may also be beneficial to group all four fingers (except for the thumb) on a single finger support lever (FIG. 9D), or alternatively, to provide only a single index finger support lever (FIG. 9E).

Figure 9F:
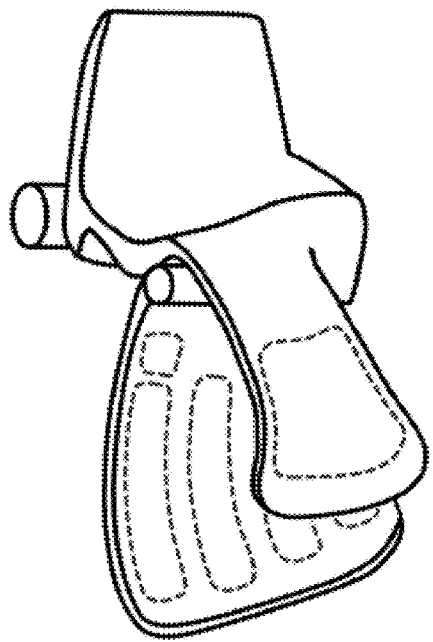
Figure 9E:
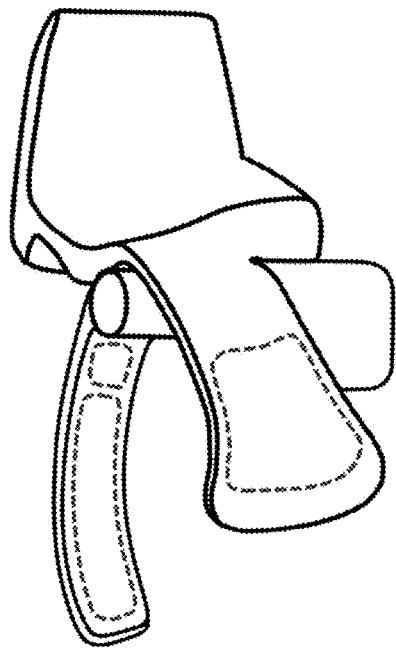
Figure 9G:
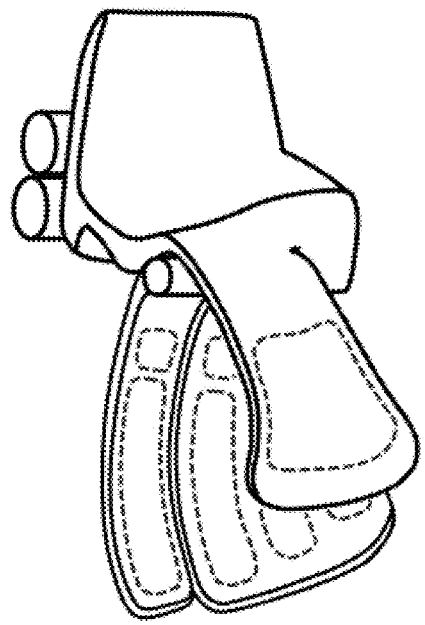

According to further embodiments as illustrated in FIGS. 9F and 9G, the device body and the force and/or torque generation means may be located at the dorsal side of the hand.

Notwithstanding the different grouping options for the fingers, the hand controller comprises sensors that discriminate between the different fingers of the users as illustrated by the areas surrounded by the dashed lines.

Figure 10:
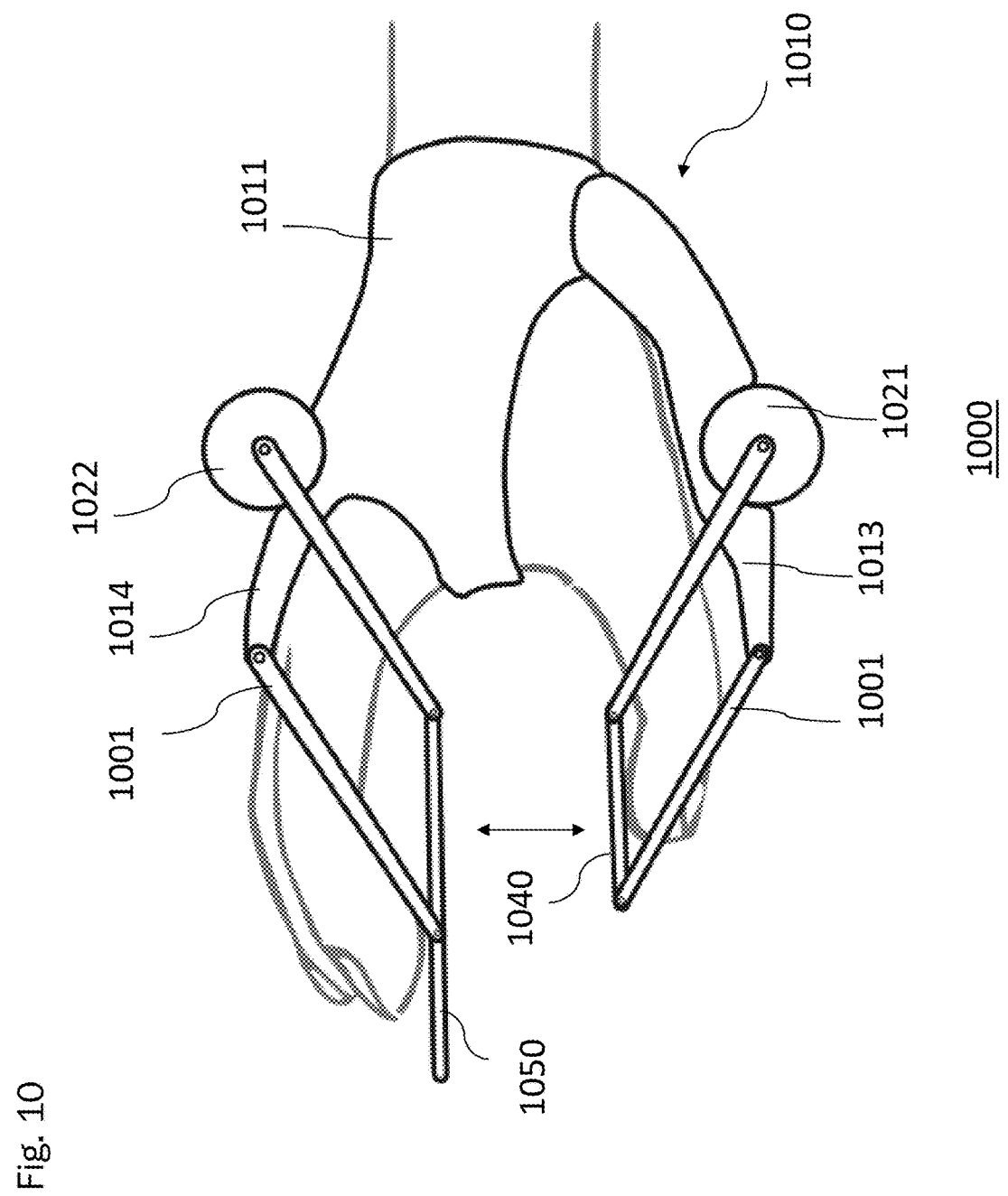
FIGS. 10, 11, 12 illustrate schematically further embodiments of the present invention.
Figure 11:
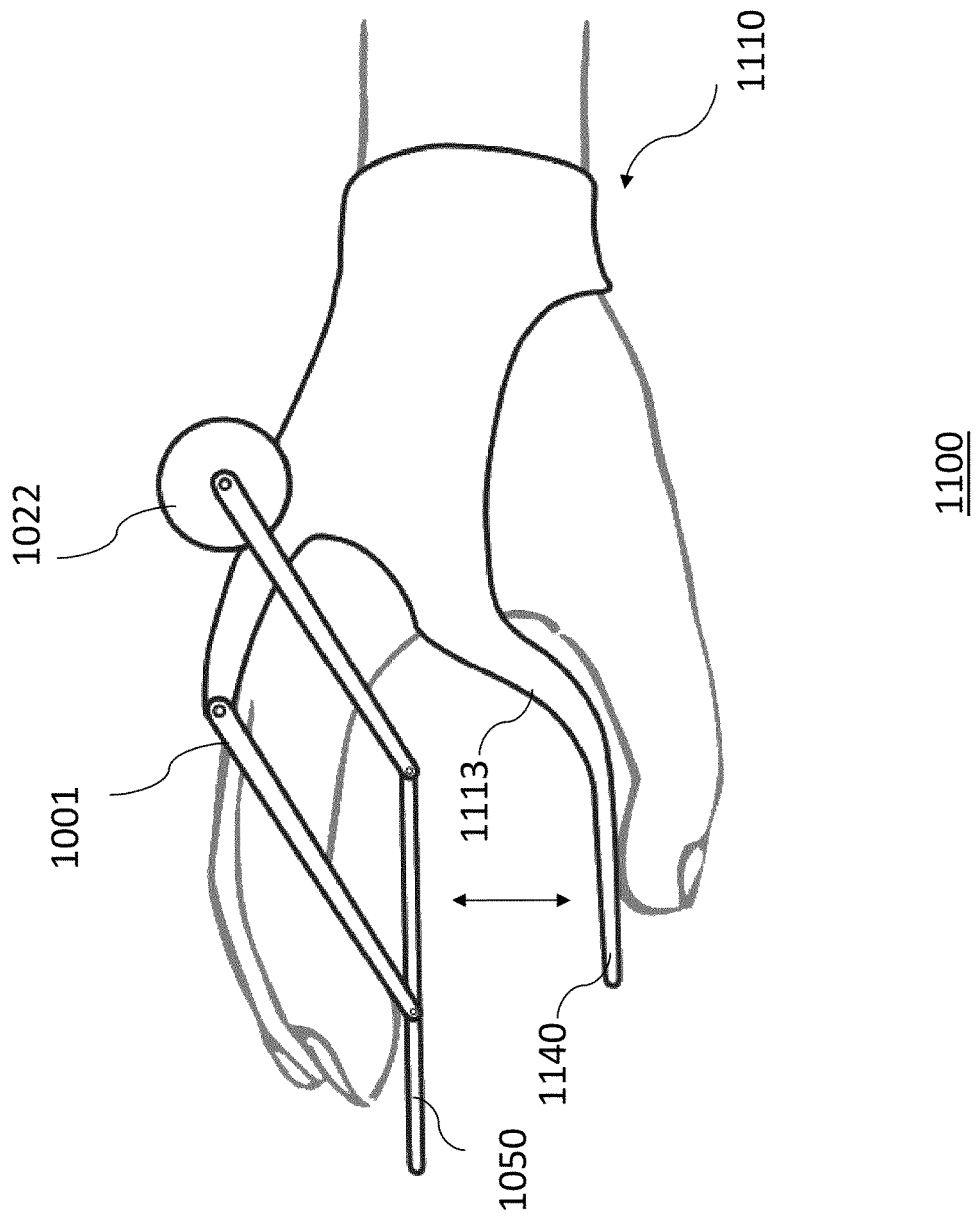
Figure 12:
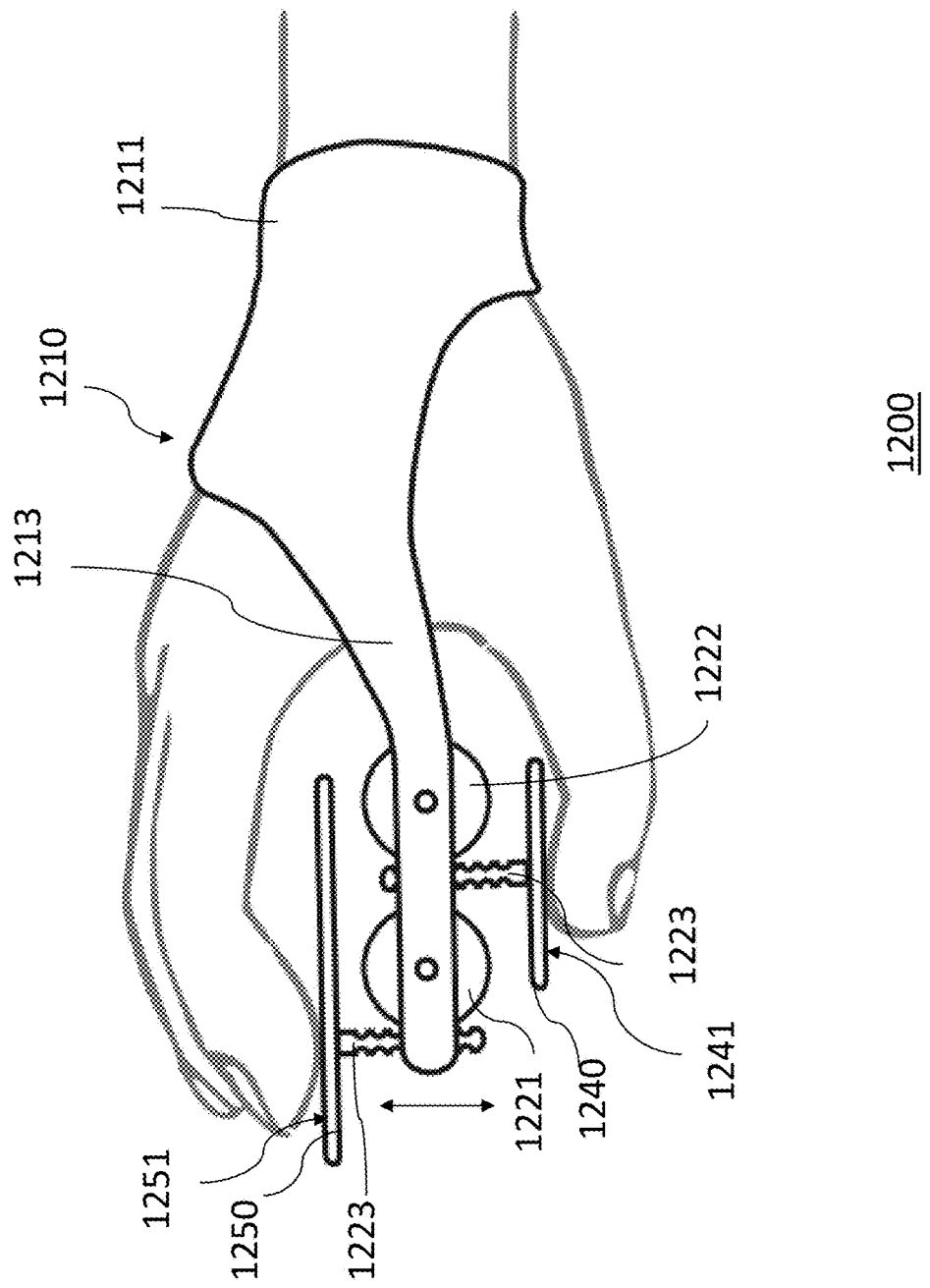

FIGS. 10, 11 and 12 illustrate further embodiments of the invention. The aspects regarding the detection of a finger position and/or movement on the finger supporting means are identical as for the embodiments described in FIGS. 2A to 9G and is therefore not described again. The same applies to the possible different shapes of the finger supporting means.

The embodiment of a hand controller 1000 shown in FIG. 10 comprises a first finger supporting means 1040 formed as a plate. A four-bar linkage structure 1001 pivotably couples the first finger supporting means 1040 to a first extending end portion 1013 of a support structure 1010 and a motor 1021. The first finger supporting means 1040 supports a user's thumb when the thumb is positioned between the first finger supporting means 1040 and the first extending end portion 1013 of the support structure 1010 so that the first extending end portion 1013 is positioned on a dorsal sides of the user's thumb. The two pairs of bars of the four-bar linkage structure 1001 protrude along opposing sides of the user's thumb when the hand controller device is put on the user's hand.

The hand controller 1000 further comprises a second plate-shaped finger supporting means 1050 that is pivotably coupled with another four-bar linkage structure 1001 to a second protruding end portion 1014 of a support structure 1010 and second motor 1022. The second finger supporting means 1050 supports one or more of the user's remaining fingers when they are positioned between the second finger supporting means 1050 and the second protruding end portion 1014 of the support structure 1010 so that the second protruding end portion 1014 is positioned on a dorsal sides of the user's fingers. The two pairs of bars of the four-bar linkage structure 1001 connected to the second finger supporting means protrude along opposing sides of the user's remaining fingers when the hand controller device 1000 is put on the user's hand. The shape of the support structure 1010 is ergonomically shaped so that it can be comfortably positioned around a user's hand and fingers.

The motors 1021 and 1022 are coupled to one of the four-bar linkage structures 1001 to generate a force between the opposing first and second finger supporting means. A force generated between the opposing first and second finger supporting means by the users' hand or the motors 1021 and 1022 results in a parallel displacement movement of the op-posing plates as indicated by the double-arrow in FIG. 10. The support structure 1010 further comprises a wristband or sleeve portion 1011 for providing hand support to increase stability and wearing comfort of the hand controller device 1000. According to a further embodiment (not shown), the bars of the four-bar linkage structure may have a different length resulting in a non-parallel displacement and a varying angle between the opposing finger supporting means upon generation of a force between the opposing first and second finger supporting means.

FIG. 11 illustrates a further exemplary embodiment of a hand controller 1100 that differs from the embodiment shown in FIG. 10 in that the first plate-shaped finger supporting means 1140 for supporting a user's thumb is mounted non-pivotably to the support structure 1110 and that no motor is coupled to the first finger support means 1140. The support structure 1110 comprises an arc-shaped connecting portion 1113 that is formed at an end portion of the plate 1140 supporting the thumb and that protrudes along an inner side of the user's thumb. According to yet another embodiment (not shown in FIG. 11), the plate 1140 could also be arranged so that it protrudes along the other side, i.e. the dorsal side, of the user's thumb.

FIG. 12 illustrates yet another embodiment of a hand controller 1200, wherein the plate-shaped first 1240 and second 1250 finger supporting means are parallel displaced from each other. The support structure 1210 for the hand controller device comprises a hand support portion 1211 formed as a wrist band and two outwardly, slightly curved projecting portions 1213 that project from the dorsal side of the user's hand towards the user's fingers. Only one of the projecting portions 1213 is visible in the side view of FIG. 12. A force/torque generation means comprising the motors 1221, 1222 and a guiding means 1223 are attached to an end portion of the projecting portions 1213 and coupled to the fingers supporting plates 1240, 1250 for generating a force between the first and second finger supporting plates 1240, 1250. The first and second finger supporting means are movable along the guiding means so that a distance between them is reduced or increased. By way of example, the guiding means 1223 is formed as a toothed bar.

Thus, in a grasped state of the hand controller 1200, both the finger support means and the force/torque generation means is surrounded by the user's palm and the user's thumb can be placed movably on an outer surface 1241 of the first finger supporting means 1240 and one or more of the other four fingers can be placed movably on an outer surface 1251 of second finger supporting means 1250.

It will be appreciated that the wiring for power supply and controlling the hand controller device is not shown in the FIGS. 2 to 12 in order to better emphasize the mechanical aspects of the embodiments.

Features, components and specific details of the structure of the above-described embodiments may be exchanged or combined to form further embodiments optimized for the respective application. As far as those modifications are already apparent for an expert skilled in the art, this shall be disclosed implicitly by the above description without specifying explicitly every possible combination, for the sake of conciseness of the present description. All aspects described in this document that are not related to the finger detecting means may be combined to form a hand controller that does not comprise a finger detecting means. In particular, a hand controller without a finger detecting means may be realized using the above described different shapes and embodiments of the finger supporting means.

The invention claimed is:

1. A hand controller device, comprising:
   a first finger supporting means for supporting a user's thumb and a second finger supporting means for supporting one or more of the user's fingers, wherein at least one of the finger supporting means is movably coupled to a support structure such that a movement of the movable finger supporting means increases or reduces an opening angle and/or a distance between the first and second finger supporting means;
   a force and/or torque generation means configured to generate a force and/or torque between the first and second finger supporting means;
   the first finger supporting means and/or the second finger supporting means comprise finger detecting means configured to detect whether or not and/or where a user's finger is in contact with a surface of the first and/or second finger supporting means, wherein whether or not and/or where a user's finger is in contact with the surface of the first finger supporting means and/or with the surface of the second finger supporting means is detected independently of whether or not the movable finger supporting means is moved, wherein the finger detecting means is further configured to determine a varying location of a user's finger on the surface of the first and/or the second finger supporting means when the finger is in or near contact with one of the finger supporting means.

2. A hand controller device according to claim 1, wherein the at least one of the finger supporting means is pivotably coupled to the support structure such that a rotation of the pivotable supporting means increases or reduces an opening angle between the opposing first and second finger supporting means.

3. A hand controller device according to claim 1, wherein the finger detecting means is configured to associate the detected location to one of the five fingers of the user's hand.

4. A hand controller device according to claim 1, wherein the hand controller is further configured to adjust the force generated between the first and second finger supporting means by the force and/or torque generation means based on the detected location of a user's finger.

5. A hand controller device according to claim 1, wherein the first and/or second finger supporting means comprises a straight or curved plate for supporting one or more of the user's fingers.

6. A hand controller device according to claim 5, wherein the straight or curved plate has a smooth surface so that a user's finger can be slidably positioned thereon.

7. A hand controller device according to claim 1, wherein the support structure and the finger supporting means are shaped and dimensioned such that the device can be grasped by a hand of a user, wherein in a grasped state, the device is positionable so that at least a portion of the support structure can be surrounded by the user's palm and a thumb of a user can be placed movably on an outer surface of the first finger supporting means and one or more of the other four fingers can be placed movably on an outer surface of the at least one second finger supporting means.

8. A hand controller device, comprising:
   a first finger supporting means for supporting a user's thumb and a second finger supporting means for supporting one or more of the user's fingers, wherein at least one of the finger supporting means is movably coupled to a support structure such that a movement of the movable finger supporting means increases or reduces an opening angle and/or a distance between the first and second finger supporting means;
   a force and/or torque generation means configured to generate a force and/or torque between the first and second finger supporting means;
   the first finger supporting means and/or the second finger supporting means comprise finger detecting means configured to detect whether or not and/or where a user's finger is in contact with a surface of the first and/or second finger supporting means, wherein whether or not and/or where a user's finger is in contact with the surface of the first finger supporting means and/or with the surface of the second finger supporting means is detected independently of whether or not the movable finger supporting means is moved, wherein the finger detecting means of the second finger supporting means is a multi-touch sensing means configured to determine two or more points of contact with the surface of the second finger supporting means.

9. A hand controller device according to claim 8, wherein the force and/or torque generation means comprises a Capstan transmission.

10. A hand controller device, comprising:
    a first finger supporting means for supporting a user's thumb and a second finger supporting means for supporting one or more of the user's fingers, wherein at least one of the finger supporting means is movably coupled to a support structure such that a movement of the movable finger supporting means increases or reduces an opening angle and/or a distance between the first and second finger supporting means;

a force and/or torque generation means configured to generate a force and/or torque between the first and second finger supporting means;

the first finger supporting means and/or the second finger supporting means comprise finger detecting means configured to detect whether or not and/or where a user's finger is in contact with a surface of the first and/or second finger supporting means, wherein whether or not and/or where a user's finger is in contact with the surface of the first finger supporting means and/or with the surface of the second finger supporting means is detected independently of whether or not the movable finger supporting means is moved, wherein the force and/or torque generation means comprises for each pivotably mounted finger supporting means: a drive train that is coupled to one of the finger supporting means to generate the torque and/or force on the finger supporting means, wherein at least a part of the drive train is integrated into the support structure.

11. A hand controller device according to claim 10, wherein the force/torque generation means comprises for each pivotably mounted finger supporting means: a drive train that is coupled to one of the finger supporting means to generate a torque and/or force on the finger supporting means, wherein at least a part of the drive train is integrated into the support structure, and at least a part of the drive train is positioned partly inside the Capstan transmission.

12. A hand controller device, comprising:

a first finger supporting means for supporting a user's thumb and a second finger supporting means for supporting one or more of the user's fingers, wherein at least one of the finger supporting means is movably coupled to a support structure such that a movement of the movable finger supporting means increases or reduces an opening angle and/or a distance between the first and second finger supporting means;

a force and/or torque generation means configured to generate a force and/or torque between the first and second finger supporting means;

the first finger supporting means and/or the second finger supporting means comprise finger detecting means configured to detect whether or not and/or where a user's finger is in contact with a surface of the first and/or second finger supporting means, wherein whether or not and/or where a user's finger is in contact with the surface of the first finger supporting means and/or with the surface of the second finger supporting means is detected independently of whether or not the movable finger supporting means is moved, wherein the device is configured as a force-reflective master device for hand remote-controlling a slave device, wherein the device is configured to map detected contact points on the surface of the first and second finger supporting means as control outputs to predetermined input channels of a slave device, and wherein the force and/or torque generation means of the master device is configured to receive force feedback commands from the slave device to generate the force and/or torque between the first and second finger supporting means.

13. A hand controller device according to claim 12, wherein the force and/or torque generation means comprises a passive force and/or torque generation means based on a locking mechanism with a restoring force.

14. A force-reflective master-slave system comprising a hand controller device according to claim 12 as a master device.

* * * * *